US011069203B2

(12) United States Patent
Iizaka et al.

(10) Patent No.: US 11,069,203 B2
(45) Date of Patent: Jul. 20, 2021

(54) COMMODITY INFORMATION READING APPARATUS AND PROGRAM

(71) Applicant: TOSHIBA TEC KABUSHIKI KAISHA, Tokyo (JP)

(72) Inventors: Hitoshi Iizaka, Fuji Shizuoka (JP); Jun Kikuchi, Tagata Shizuoka (JP); Makoto Nozawa, Sunto Shizuoka (JP); Tsuyoshi Gotanda, Tokyo (JP); Tomonori Sugiyama, Yokohama Kanagawa (JP); Shota Konishi, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/689,250

(22) Filed: Nov. 20, 2019

(65) Prior Publication Data

US 2020/0265689 A1 Aug. 20, 2020

(30) Foreign Application Priority Data

Feb. 20, 2019 (JP) ............................ JP2019-028119

(51) Int. Cl.
*G07G 1/00* (2006.01)
*G07G 1/12* (2006.01)

(52) U.S. Cl.
CPC ......... *G07G 1/0054* (2013.01); *G07G 1/0081* (2013.01); *G07G 1/12* (2013.01)

(58) Field of Classification Search
CPC ...... G07G 1/0054; G07G 1/0081; G07G 1/12; G07G 1/0063; G06Q 20/208
See application file for complete search history.

(56) References Cited

U.S. PATENT DOCUMENTS

| | | | |
|---|---|---|---|
| 5,679,941 A | 10/1997 | Iizaka et al. |
| 2010/0158310 A1 | 6/2010 | McQueen et al. |
| 2014/0052555 A1 | 2/2014 | MacIntosh |
| 2014/0112524 A1 | 4/2014 | Bai et al. |

(Continued)

FOREIGN PATENT DOCUMENTS

WO 2014/063157 4/2014

OTHER PUBLICATIONS

Extended European Search Report for European Patent Application No. 20150946.0 dated Jul. 6, 2020.

*Primary Examiner* — Seung H Lee
(74) *Attorney, Agent, or Firm* — Amin, Turocy & Watson, LLP

(57) ABSTRACT

According to one embodiment, a code symbol reading unit (first reading unit) reads a barcode (code symbol) attached to a commodity from images of the commodity captured by an image control unit (imaging unit) using a first camera, a second camera, and a third camera. An electronic watermark reading unit (second reading unit) reads an electronic watermark attached to the commodity from the images. An object recognition unit (commodity recognition unit) recognizes the commodity from the images. Further, a commodity identification unit (commodity identification unit) identifies the commodity appearing in the images based on at least one of a reading result of the code symbol reading unit, a reading result of the electronic watermark reading unit, and a recognition result of the object recognition unit.

17 Claims, 9 Drawing Sheets

(56) References Cited

U.S. PATENT DOCUMENTS

| | | | | |
|---|---|---|---|---|
| 2017/0046605 | A1* | 2/2017 | Asthana | G06K 19/06037 |
| 2018/0174358 | A1 | 6/2018 | Gao | |
| 2019/0318144 | A1 | 10/2019 | Iizaka | |
| 2019/0385034 | A1* | 12/2019 | Evans | G06K 19/06065 |

* cited by examiner

COMMODITY INFORMATION READING APPARATUS AND PROGRAM

CROSS-REFERENCE TO RELATED APPLICATION

This application is based upon and claims the benefit of priority from Japanese Patent Application No. 2019-028119, filed in Feb. 20, 2019, the entire contents of which are incorporated herein by reference.

FIELD

Embodiments described herein relate to a commodity information reading apparatus and program.

BACKGROUND

In related art, when a customer registers a commodity to purchase in a store such as a supermarket or convenience store, the commodity is specified by reading of a barcode attached to or printed on a package of the commodity and recognition of a JAN (Japanese Article Number) code registered in the barcode. Further, these days, the so-called object recognition technique of imaging an appearance of a commodity with a camera and specifying the commodity based on the captured image of the appearance of the commodity is put to practical use.

For example, a system of identifying a commodity using both reading of a barcode and object recognition is proposed.

However, in the system of related art, it is necessary for a worker to determine whether or not code information of barcodes or the like are provided to commodities and sort the commodities with the code information and the commodities without the code information in advance, and the work takes time and effort.

DETAILED DESCRIPTION

A challenge is to provide a commodity information reading apparatus and program that can read commodity information with less time and effort regardless of forms of commodities.

A commodity information reading apparatus of an embodiment includes imaging means, first reading means, second reading means, and commodity identification means. The imaging means captures an image of a commodity. The first reading means reads a code symbol attached to the commodity from the image. The second reading means reads an electronic watermark attached to the commodity from the image. The commodity identification means identifies the commodity appearing in the image based on at least one of a reading result of the first reading means and a reading result of the second reading means.

First Embodiment

As below, a merchandise sale data processing system according to a first embodiment will be explained with reference to the drawings. Note that the merchandise sale data processing system to be described in the first embodiment is a system for a customer him- or herself to check out a purchased commodity. Exemplary embodiments are not limited to the following embodiments.

(Description of Commodity Information Reading Apparatus)

Figure 1:
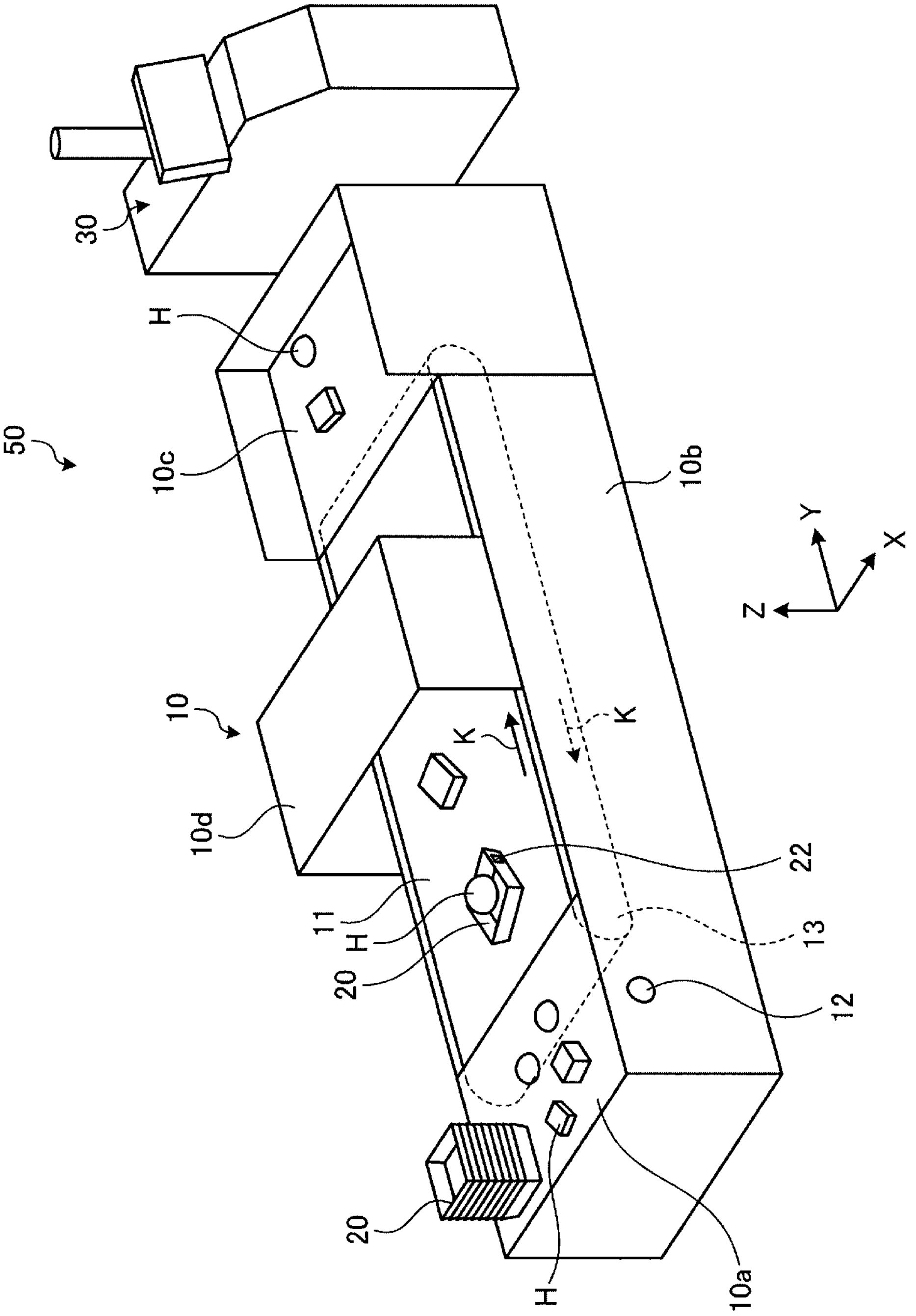
FIG. 1 is an appearance diagram showing an example of a merchandise sale data processing system to which a commodity information reading apparatus according to an embodiment is applied.

First, a configuration of a commodity information reading apparatus 10 will be explained using FIG. 1. FIG. 1 is an appearance diagram showing an example of a merchandise sale data processing system 50 to which the commodity information reading apparatus 10 according to an embodiment is applied.

As shown in FIG. 1, the merchandise sale data processing system 50 includes the commodity information reading apparatus 10 and a checkout apparatus 30. The commodity information reading apparatus 10 performs a reading process of reading commodity information of a commodity purchased by a customer and a commodity registration process of registering the commodity read by the reading process. The checkout apparatus 30 performs a checkout process on the commodity registered by the commodity registration process.

The commodity information reading apparatus 10 includes a commodity placement counter 10*a*, a base 10*b*, a packing counter 10*c*, and a reading unit 10*d*.

The commodity placement counter 10*a* is a counter on which the customer temporarily mounts commodities H to purchase. The commodity placement counter 10*a* includes a motion detector 12. The motion detector 12 includes e.g. an infrared sensor and detects proximity of the customer. When the motion detector 12 detects proximity of the customer, a belt conveyer 11, which will be described later, starts to move and the reading unit 10*d* is activated. Trays 20 as equipment for the store are placed on the commodity placement counter 10*a*. RFID tags 22 are attached to the trays 20. The usage of the trays 20 will be described later. Here, the RFID tag 22 is an example of a wireless tag.

The base 10*b* is a housing connecting the commodity placement counter 10*a* and the packing counter 10*c*. The base 10*b* includes the belt conveyer 11 that moves from the commodity placement counter 10*a* toward the packing counter 10*c*. The belt conveyer 11 is driven by a conveyer drive motor 13 and moves in a direction of an arrow K, i.e., a direction along the Y axis. The customer places the commodities H temporarily mounted on the commodity placement counter 10*a* on the belt conveyer 11 to convey the commodities. Note that a roller conveyer may be used in place of the belt conveyer 11.

The packing counter 10*c* is a counter for bagging the commodities H conveyed by the belt conveyer 11. The commodities H conveyed by the belt conveyer 11 are pushed out and mounted on the packing counter 10*c* by the conveyance force of the belt conveyer 11. The customer bags the commodities H mounted on the packing counter 10*c*. Then, the customer checks out in the checkout apparatus 30.

The reading unit 10*d* performs the reading process of reading commodity information of the commodities H conveyed by the belt conveyer 11. In order to stably read the commodity information of the commodities H, the reading unit 10*d* has a tunnel shape shielded on the upper part and side surfaces for reduction of the influence by the brightness outside.

(Description of Configuration of Reading Unit)

Figure 2:
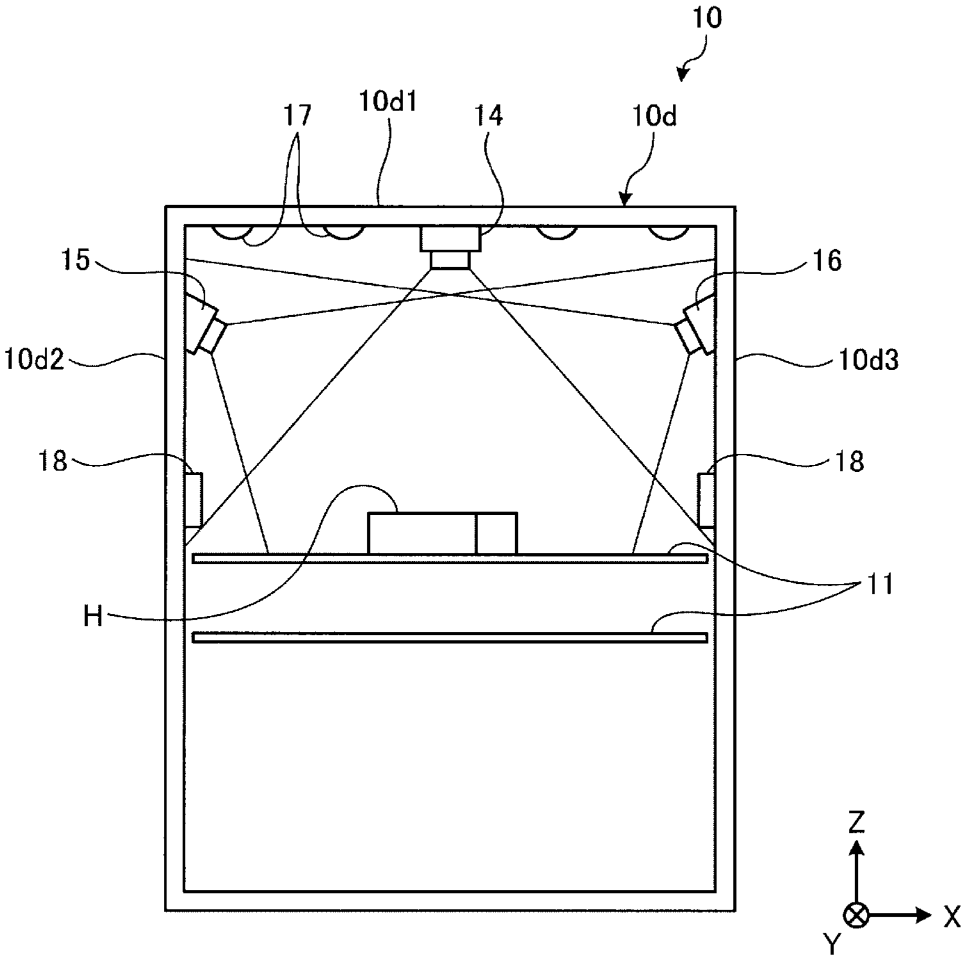
FIG. 2 is a sectional view of a reading unit of the commodity information reading apparatus of the embodiment.

Next, the configuration of the reading unit 10*d* will be explained using FIG. 2. FIG. 2 is a sectional view of the reading unit 10*d* of the commodity information reading apparatus 10 of the embodiment. Particularly, FIG. 2 is the sectional view of the reading unit 10*d* cut along the XZ plane and seen from the negative side of the Y axis.

As shown in FIG. 2, the reading unit 10*d* includes a top plate 10*d*1, a vertical wall 10*d*2, and a vertical wall 10*d*3. The top plate 10*d*1 is placed nearly in parallel to the conveyer surface of the belt conveyer 11. Both the vertical wall 10*d*2 and the vertical wall 10*d*3 are placed nearly along the vertical direction.

A first camera 14 is placed on the top plate 10*d*1. The first camera 14 is placed to face downward toward the belt conveyer 11, and includes an image sensor such as a CCD (Charge Coupled Device) or CMOS (Complementary Metal-Oxide Semiconductor) and an optical system including a lens. The first camera 14 images the conveyer surface of the belt conveyer 11.

A second camera 15 is placed on the vertical wall 10*d*2. Further, a third camera 16 is placed on the vertical wall 10*d*3. The first camera 14, the second camera 15, and the third camera have nearly equal imaging properties. Further, the placement locations and the placement directions are adjusted so that regions not in contact with the conveyer surface of the commodities H conveyed by the belt conveyer 11 may be completely visually recognized using the images captured by the respective cameras. Furthermore, the first camera 14, the second camera 15, and the third camera 16 are controlled to perform simultaneous imaging by an imaging control unit 111 (FIG. 7), which will be described later. In the embodiment, the configuration using the three cameras is explained as an example, however, the number of cameras is not limited to three.

Illumination lights 17 are placed on the top plate 10*d*1. The illumination lights 17 include e.g. LEDs (Light Emitting Diodes) and illuminate in a direction toward the conveyer surface of the belt conveyer 11. Note that the number, placement locations, colors of the illumination lights 17 are not limited, but adjusted so that the commodities H conveyed by the belt conveyer 11 may be clearly imaged by the respective cameras. Specifically, in order to clearly image the commodities H conveyed by the moving belt conveyer 11, it is desirable to perform imaging at as fast shutter speeds as possible. In addition, it is desirable to illuminate as bright as possible using the illumination lights 17 to prevent underexposure of the captured images.

Antennas 18 are respectively placed near the conveyer surface on the vertical wall 10*d*2 and the vertical wall 10*d*3. The antennas 18 communicate with the RFID tags 22 attached to the trays 20. Then, a wireless tag reader 19 (see FIG. 5) reads tag information from the RFID tags 22 superimposed on received radio waves.

(Description of Configuration of Checkout Apparatus)

Figure 3:
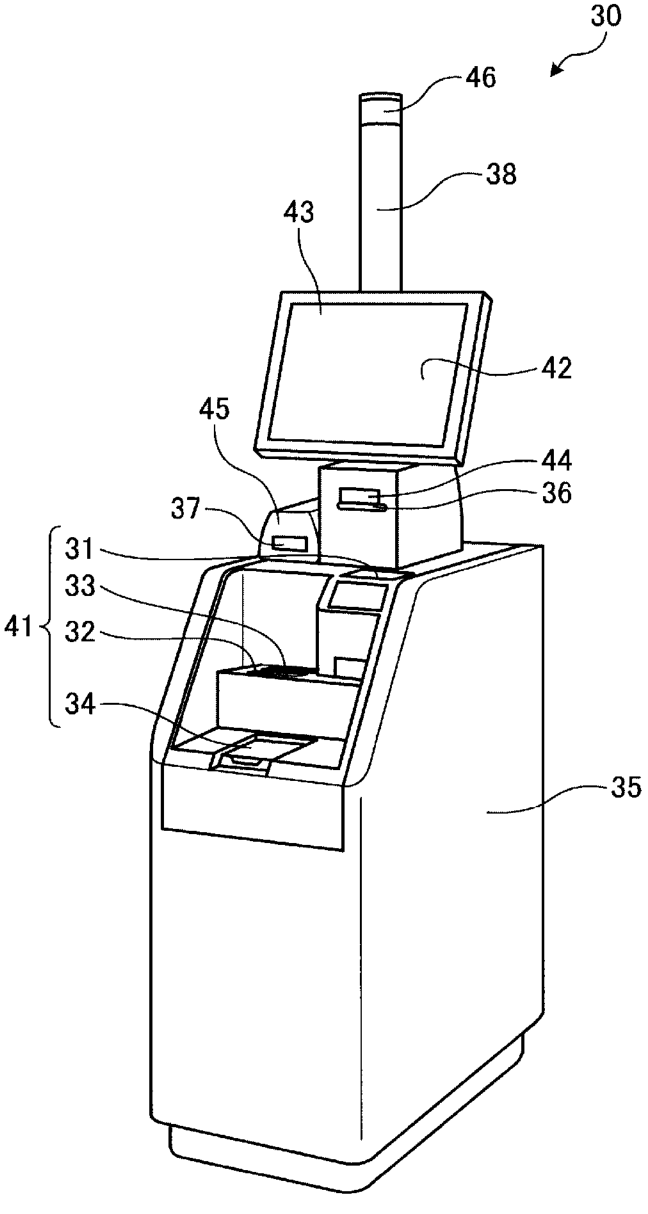
FIG. 3 is an appearance diagram showing an example of a checkout apparatus.

Next, the configuration of the checkout apparatus will be explained using FIG. 3. FIG. 3 is an appearance perspective view showing the checkout apparatus 30. The checkout apparatus 30 includes a deposit and withdrawal device 41, a monitor 42, a touch panel 43, a receipt printer 44, a card reader 45, and a light emitting unit 46 in an upper part of a housing 35.

The deposit and withdrawal device 41 includes a coin entrance 31, a bill entrance 32, bill exit 33, and a coin exit 34. The deposit and withdrawal device 41 holds the bills entered into the bill entrance 32 in a bill holding part (not shown). Further, the deposit and withdrawal device 41 holds the coins entered into the coin entrance 31 in a coin holding part (not shown). The deposit and withdrawal device 41 dispenses bills for change in response to a dispense request of change from a control unit 300 (see FIG. 6) to the bill exit 33. Further, the deposit and withdrawal device 41 dispenses coins for change in response to a dispense request of change from the control unit 300 to the coin exit 34.

The monitor 42 includes the touch panel 43 on the surface thereof. The monitor 42 includes e.g. a liquid crystal panel, and displays information on a checkout process of a total amount of single transaction etc. using images and characters. The touch panel 43 outputs information according to a touched location to the control unit 300.

The receipt printer 44 has a printing unit (not shown) and a receipt dispenser 36. The receipt printer 44 issues a receipt printed by the printing unit from the receipt dispenser 36.

The card reader 45 reads and writes information from and in credit cards, membership cards, etc. inserted from a card entrance 37.

The light emitting unit 46 is placed at the upper end of an indicator pole 38 and emits light in the case where an abnormality occurs in the operation of the checkout apparatus 30 or the like. The light emitting unit 46 includes e.g. an LED that emits blue light and an LED that emits red light. Note that the light emitting unit 46 may use LEDs in different colors than blue or red or use other light emitting members. The light emitting unit 46 is provided at the upper end of the indicator pole 38 and easily visually recognized from a store clerk around the checkout apparatus 30.

The customer operates the checkout apparatus 30 to perform a process of paying for the commodity using cash, credit card, electronic money, or the like, i.e., a checkout process. The checkout apparatus 30 displays a total amount of money for single transaction based on commodity registration information received from the commodity information reading apparatus 10 and controls a process relating to payment of the total amount of money in the checkout process. The commodity registration information contains information including the total amount of money for single transaction to be processed, commodity information of the commodity to be transacted. Note that the commodity registration information may contain other information necessary for receipt printing including e.g. promotional information for receipt printing.

(Description of Form of Commodity)

Figure 4A:
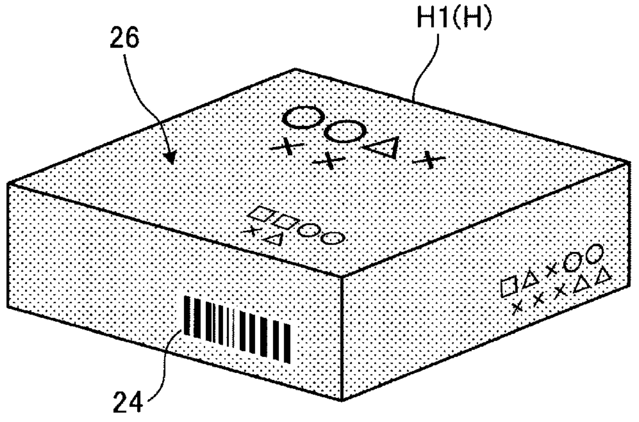
FIGS. 4A and 4B show examples of commodities to be read by the commodity information reading apparatus of the embodiment.
Figure 4B:
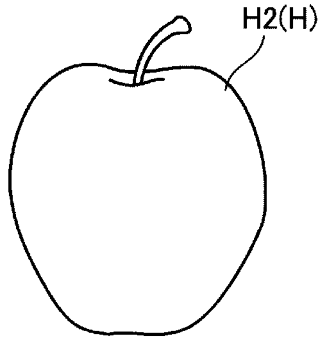

Next, forms of the commodities H to be read by the commodity information reading apparatus 10 will be explained using FIGS. 4A and 4B. FIGS. 4A and 4B show examples of the commodities H to be read by the commodity information reading apparatus of the embodiment.

The reading unit 10*d* of the commodity information reading apparatus 10 reads commodity information of the commodities H in two forms shown in FIGS. 4A and 4B. The first form is a commodity H1 provided with code information of itself as shown in FIG. 4A. That is, the commodity H1 shown in FIG. 4A is provided with a barcode 24 and an electronic watermark 26. Note that the commodities H read by the commodity information reading apparatus 10 may include mixture of the commodity H1 and a commodity H2, only the commodity H1, or only the commodity H2. In the embodiment, the case of the mixture of the commodity H1 and the commodity H2 is explained as an example.

The barcode 24 is coded information of a JAN code (13 digits or 8 digits) as a commodity identification number. Or, a two-dimensional code may be provided in place of the barcode 24. Note that the barcode 24 is an example of a code symbol.

The electronic watermark 26 is coded information equal to the commodity identification number registered in the barcode 24 using fine dots and printed on the package of the commodity H1. That is, the electronic watermark 26 is a set of fine dots and not visually recognizable. A plurality of the electronic watermarks 26 are embedded in the package of the commodity H1. Therefore, if only a part of the package of the commodity H1 appears in the captured image of the commodity H1, the commodity identification number may be read by an analysis of the image. Accordingly, the information of the electronic watermark 26 may be reliably read regardless of the mounting condition of the commodity H1. The electronic watermarks are widely put into practice these days for preventing forgery of bills, stamps, securities, etc. Dedicated image recognition software is necessary for reading of the electronic watermark 26, however, the explanation thereof is omitted.

The commodity H1 may have a form having only the electronic watermark 26. Or, the commodity H1 may have a form having only the barcode 24 and, in this case, modification of the configuration of the reading unit 10*d* is necessary. This is because, when the commodity H1 is mounted with the surface provided with the barcode 24 facing the conveyer surface of the belt conveyer 11, the surface provided with the barcode 24 is blind from the above described respective cameras and the barcode 24 is not readable. To address the case, for example, it is necessary to form the conveyer surface of the belt conveyer 11 using a transparent material and place another camera on the back side of the conveyer surface. Note that, in the following explanation, it is assumed that the commodity H1 is provided with both the barcode 24 and the electronic watermark 26.

As shown in FIG. 4B, the second form of the commodity H is a commodity H2 without the barcode 24 or electronic watermark 26. For example, a vegetable, fruit, or the like not bagged corresponds to the commodity H2.

The reading unit 10*d* executes the so-called object recognition of identifying the commodity from the captured image of the appearance of the commodity H2. By the object recognition, the reading unit 10*d* identifies the commodity H2 appearing in the image.

The object recognition of recognizing the commodity H2 contained in the image is also called generic object recognition. Various recognition technologies used in the generic object recognition are explained in detail in the following documents and the explanation is omitted.

Keiji Yanai, "The Current State and Future Directions on Generic Object Recognition", Journal of Information Processing Society of Japan, Vol. 48, No. SIG 16 [Searched on Feb. 12, 2019], Internet <URL: http://mm.cs.uec.ac.jp/IPSJ-TCVIM-Yanai.pdf>. Jamie Shotton et al., "Semantic Texton Forests for Image Categorization and Segmentation", [Searched on Feb. 12, 2019], Internet <URL: http://mi.eng.cam.ac.uk/~cipolla/publications/inproceedings/2008-CVPR-semantic-texton-forests.pdf>.

Note that the commodity H2 is mounted on the tray 20. Thereby, when the commodity information reading apparatus 10 recognizes the tray 20, the apparatus may determine that the commodity H2 is mounted on the tray 20. The commodity information reading apparatus 10 executes the object recognition without reading of the barcode 24 and the electronic watermark 26 under the condition of recognition of the tray 20. Thereby, efficiency of the processes may be promoted.

Further, the commodity H2 mounted on the tray 20 is imaged on the uniform background color, and thereby, the object and the background may be easily and accurately separated.

Note that, when the commodity H2 is mounted on the tray 20, the single commodity H2 is mounted on the single tray 20.

(Description of Hardware Configuration of Commodity Information Reading Apparatus)

Figure 5:
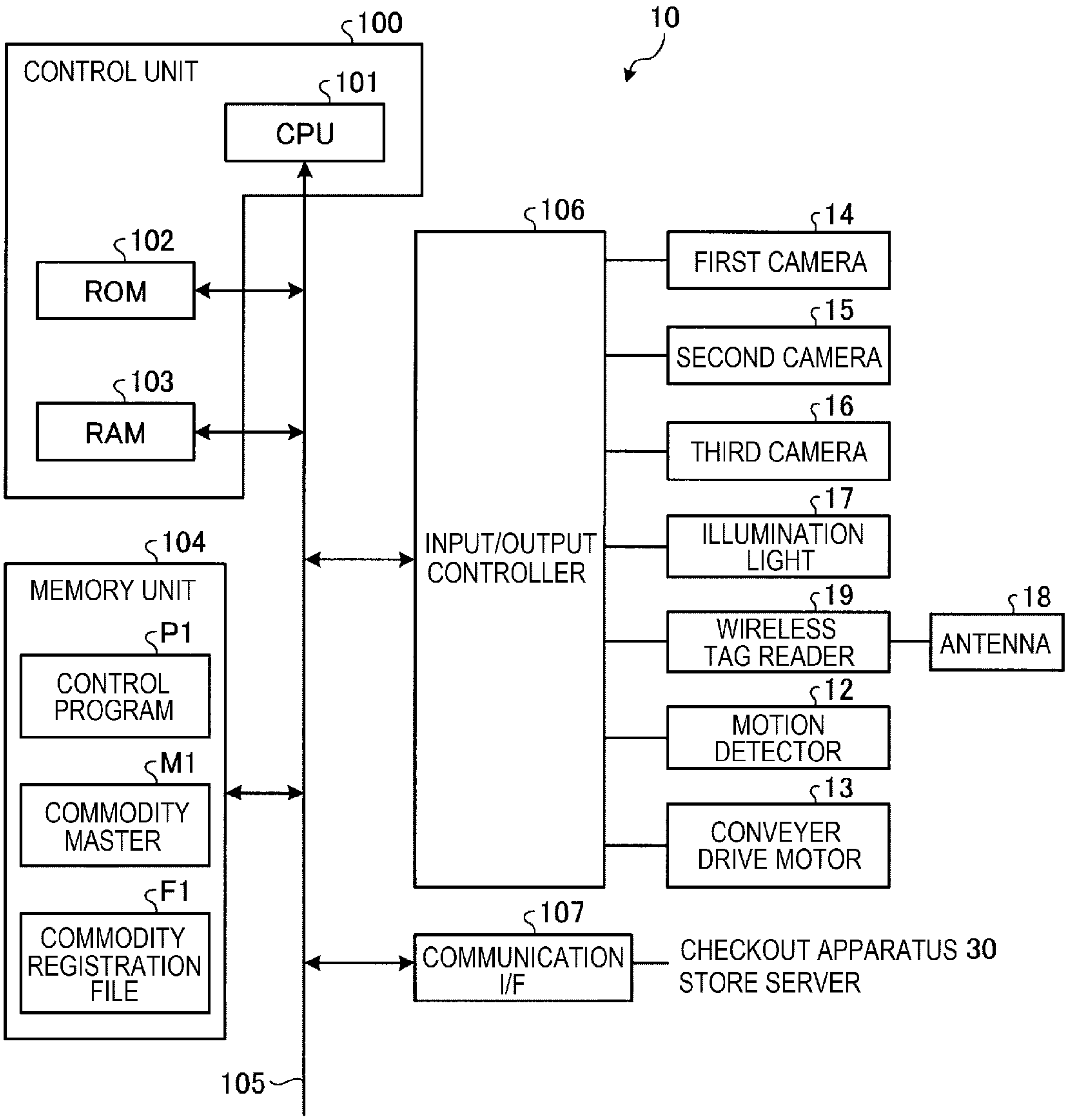
FIG. 5 is a hardware block diagram showing an example of a hardware configuration of the commodity information reading apparatus.

Next, the hardware configuration of the commodity information reading apparatus 10 will be explained using FIG. 5. FIG. 5 is a hardware block diagram showing an example of the hardware configuration of the commodity information reading apparatus 10.

A control unit 100 includes a CPU (Central Processing Unit) 101, a ROM (Read Only Memory) 102, and a RAM (Random Access Memory) 103. The CPU 101 connects the ROM 102 and the RAM 103 via a bus line 105. The CPU 101 loads a control program P1 stored in the ROM 102 or a memory unit 104 in the RAM 103. The CPU 101 controls operations of the commodity information reading apparatus 10 by acting according to the control program P1 loaded in the RAM 103. That is, the control unit 100 has a general computer configuration.

The control unit 100 further connects the memory unit 104, an input/output controller 106, and a communication I/F (interface) 107 via the bus line 105.

The memory unit 104 is a non-volatile memory such as a flash memory or an HDD (Hard Disk Drive) in which memory information is held after power is turned off. The memory unit 104 stores programs including the control program P1 etc. The control program P1 is a program for implementing functions of the commodity information reading apparatus 10.

The control program P1 may be incorporated in the ROM 102 in advance and provided. Or, the control program P1 may be configured to be recorded in a computer-readable recording medium such as a CD-ROM, flexible disc (FD), CD-R, or DVD (Digital Versatile Disc) in a file in a format installable in the control unit 100 or an executable format and provided. Or, the control program P1 may be configured to be stored on a computer connected to a network such as the Internet, downloaded via the network, and provided. Or, the control program P1 may be configured to be provided or delivered via a network such as the Internet.

The memory unit 104 stores a commodity master M1 and a commodity registration file F1. The commodity master M1 is a master file that stores commodity information (commodity codes, commodity names, prices, etc.) of commodities available in the store. Note that the commodities available in the store change on a daily basis, and accordingly, the commodity information reading apparatus 10 acquires the latest commodity master M1 from a store server (not shown) using the communication I/F 107. The commodity master M1 further stores feature data necessary for the object recognition with respect to commodities as objects of the object recognition, which will be described later.

The commodity registration file F1 is a file that stores commodity information (commodity name, price, etc.) of the commodity purchased by the customer acquired from the commodity master M1.

The input/output controller 106 connects the first camera 14, the second camera 15, the third camera 16, the illumination lights 17, the wireless tag reader 19, the motion detector 12, and the conveyer drive motor 13 shown in FIG. 5. The functions of the respective hardware are as described above, and the explanation thereof is omitted. The input/output controller 106 controls operations of the connected various kinds of hardware according to commands from the control unit 100.

The communication I/F 107 mutually communicates with the checkout apparatus 30 and the store server (not shown).

(Description of Hardware Configuration of Checkout Apparatus)

Figure 6:
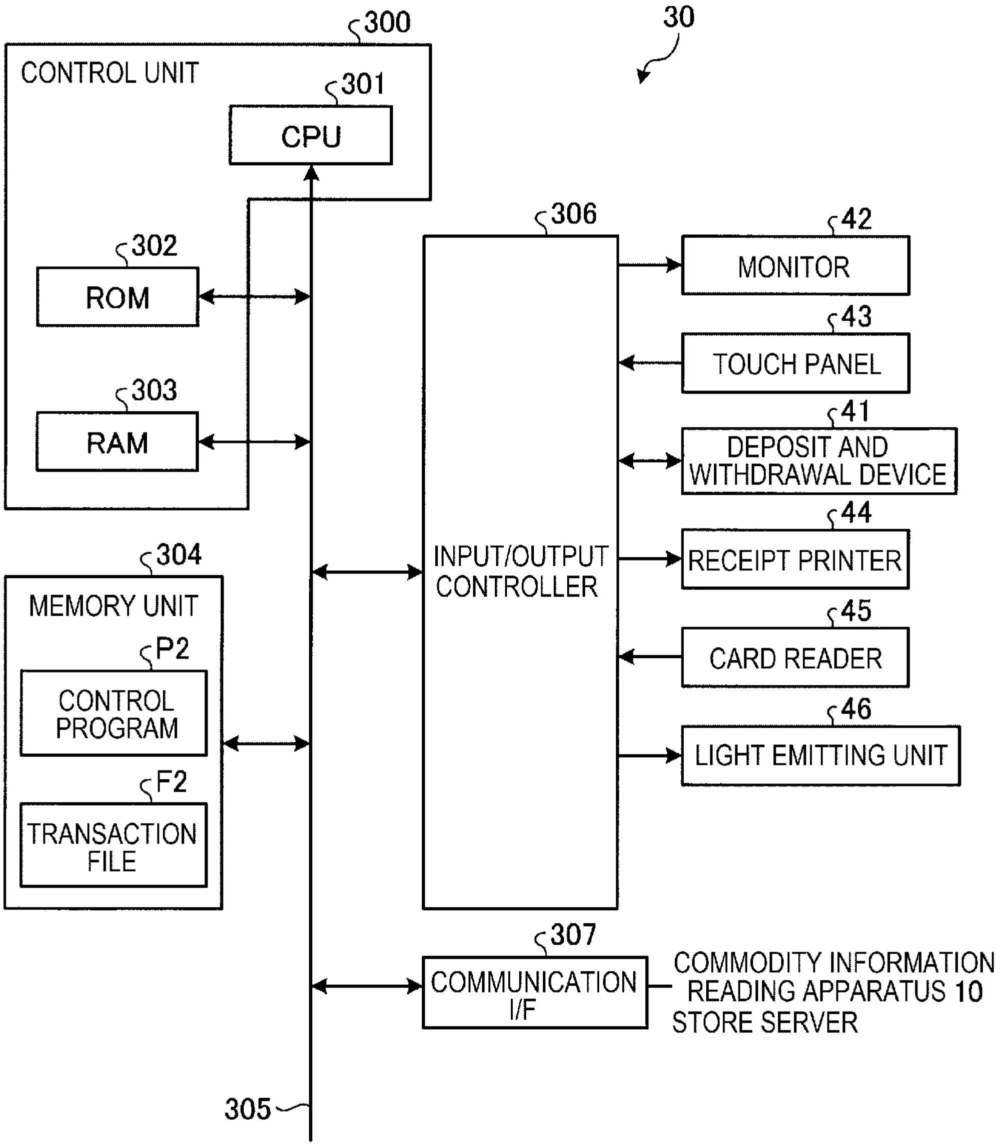
FIG. 6 is a hardware block diagram showing an example of a hardware configuration of the checkout apparatus.

Next, the hardware configuration of the checkout apparatus 30 will be explained using FIG. 6. FIG. 6 is a hardware block diagram showing an example of the hardware configuration of the checkout apparatus 30. The checkout apparatus 30 includes a control unit 300, a memory unit 304, an input/output controller 306, and a communication I/F 307.

The control unit 300 includes a CPU 301, a ROM 302, and a RAM 303. The CPU 301 connects the ROM 302 and the RAM 303 via a bus line 305. The CPU 301 loads a control program P2 stored in the ROM 302 or a memory unit 304 in the RAM 303. The CPU 301 controls operations of the checkout apparatus 30 by acting according to the control program P2 loaded in the RAM 303. That is, the control unit 300 has a general computer configuration.

The control unit 300 further connects the memory unit 304, the input/output controller 306, and the communication I/F 307 via the bus line 305.

The memory unit 304 is a non-volatile memory such as a flash memory or an HDD in which memory information is held after power is turned off. The memory unit 304 stores programs including the control program P2 etc. The control program P2 is a program for implementing functions of the checkout apparatus 30.

The control program P2 may be incorporated in the ROM 302 in advance and provided. Or, the control program P2 may be configured to be recorded in a computer-readable recording medium such as a CD-ROM, flexible disc (FD), CD-R, or DVD in a file in a format installable in the control unit 300 or an executable format and provided. Or, the control program P2 may be configured to be stored on a computer connected to a network such as the Internet, downloaded via the network, and provided. Or, the control program P2 may be configured to be provided or delivered via a network such as the Internet.

The memory unit 304 stores a transaction file F2. The transaction file F2 is a data file that stores contents of the commodity registration file F1 received from the commodity information reading apparatus 10, checkout data recording results of the checkout processes executed by the checkout apparatus 30, etc. The transaction file F2 is used as data recording a transaction history.

The input/output controller 306 connects the monitor 42, the touch panel 43, the deposit and withdrawal device 41, the receipt printer 44, the card reader 45, and the light emitting unit 46 shown in FIG. 6. The functions of the respective hardware are as described above, and the explanation thereof is omitted. The input/output controller 306 controls operations of the connected various kinds of hardware according to commands from the control unit 300.

The communication I/F 307 mutually communicates with the commodity information reading apparatus 10 and the store server (not shown).

(Description of Functional Configuration of Commodity Information Reading Apparatus)

Figure 7:
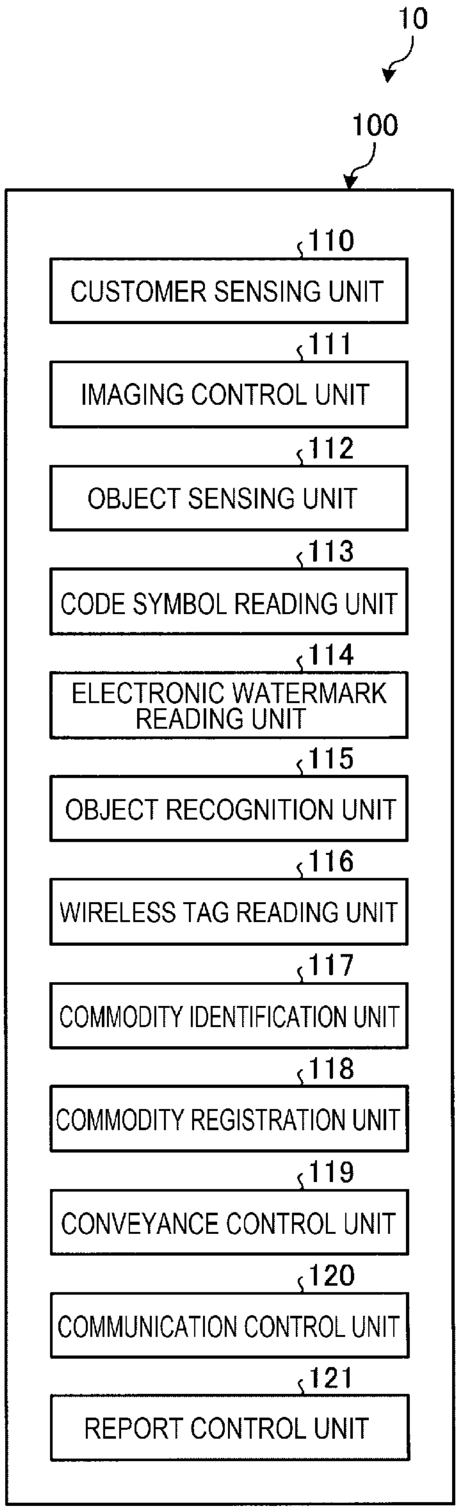
FIG. 7 is a functional block diagram showing an example of a functional configuration of the commodity information reading apparatus of the embodiment.

Next, the functional configuration of the commodity information reading apparatus 10 of the embodiment will be explained using FIG. 7. FIG. 7 is a functional block diagram showing an example of the functional configuration of the commodity information reading apparatus 10 of the embodiment. The control unit 100 of the commodity information reading apparatus 10 loads the control program P1 in the RAM 103 and runs the program, and thereby, realizes a customer sensing unit 110, the imaging control unit 111, an object sensing unit 112, a code symbol reading unit 113, an electronic watermark reading unit 114, an object recognition unit 115, a wireless tag reading unit 116, a commodity identification unit 117, a commodity registration unit 118, a conveyance control unit 119, a communication control unit 120, and a report control unit 121 shown in FIG. 7 as functional units.

The customer sensing unit 110 senses proximity of the customer to the commodity information reading apparatus 10. Specifically, the customer sensing unit 110 senses proximity of the customer by monitoring output of the motion detector 12.

The imaging control unit 111 allows the first camera 14, the second camera 15, and the third camera 16 to capture images of the appearance of the commodity H conveyed by the belt conveyer 11. Note that the imaging control unit 111 is an example of an imaging unit.

The object sensing unit 112 senses whether an object appears in the images captured by the first camera 14, the second camera 15, and the third camera 16. For example, the object sensing unit 112 detects changes in brightness between the images by calculating differences between the images continuously captured by the same camera. Then, the object sensing unit 112 determines that the object appears on the conveyer surface of the belt conveyer 11 under the condition of detection of the changes in brightness between the images.

The code symbol reading unit 113 reads the barcode 24 (code symbol) attached to the commodity H from the images captured by the imaging control unit 111. Note that the code symbol reading unit 113 is an example of a first reading unit.

The electronic watermark reading unit 114 reads the electronic watermark 26 attached to the commodity H from the images captured by the imaging control unit 111. Note that the electronic watermark reading unit 114 is an example of a second reading unit.

The object recognition unit 115 performs the object recognition on the images captured by the imaging control unit 111 and recognizes the commodity H. Note that the object recognition unit 115 is an example of a commodity recognition unit.

The wireless tag reading unit 116 performs wireless communication with the RFID tag 22, and thereby, reads information transmitted by the RFID tag 22. Note that the wireless tag reading unit 116 is an example of a wireless tag reading unit.

The commodity identification unit 117 identifies the commodity H based on a reading result of the code symbol reading unit 113, a reading result of the electronic watermark reading unit 114, and a recognition result of the object recognition unit 115 with respect to the same commodity H. Note that the commodity identification unit 117 is an example of a commodity identification unit.

The commodity registration unit 118 registers information on the commodity H identified by the commodity identification unit 117.

The conveyance control unit 119 controls movement of the belt conveyer 11.

The communication control unit 120 mutually communicates with the checkout apparatus 30 and the store server (not shown) and transmits and receives data, files, etc.

The report control unit 121 reports when the identification of the commodity H by the commodity identification unit 117 is hard.

The control unit 300 of the checkout apparatus 30 loads the control program P2 in the RAM 303 and run the program, thereby, configures various kinds of functional units for the checkout process, and the explanation thereof is omitted.

(Description of Flow of Processing Performed by Merchandise Sale Data Processing System)

Figure 8:
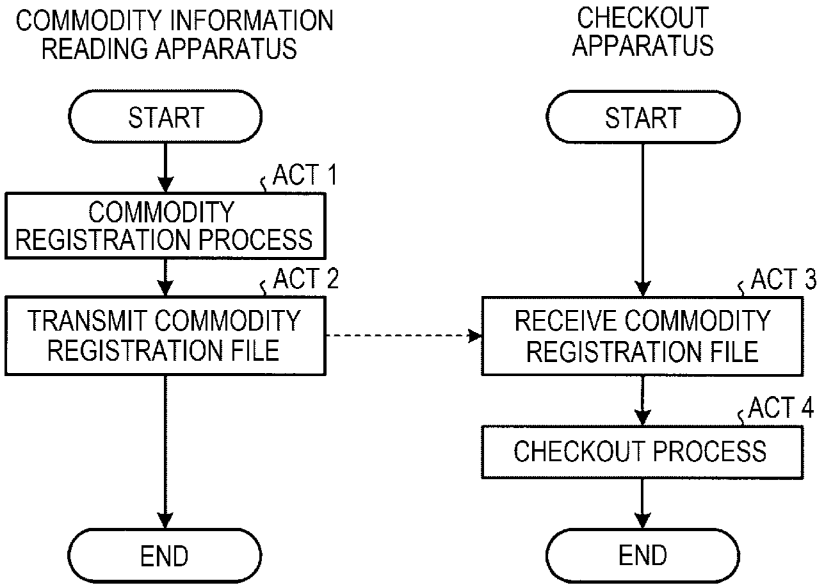
FIG. 8 is a flowchart showing an example of a flow of processing performed by the merchandise sale data processing system of the embodiment.

Next, a flow of the processing performed by the merchandise sale data processing system 50 will be explained using FIG. 8. FIG. 8 is a flowchart showing an example of the flow of processing performed by the merchandise sale data processing system. 50 of the embodiment.

Figure 9:
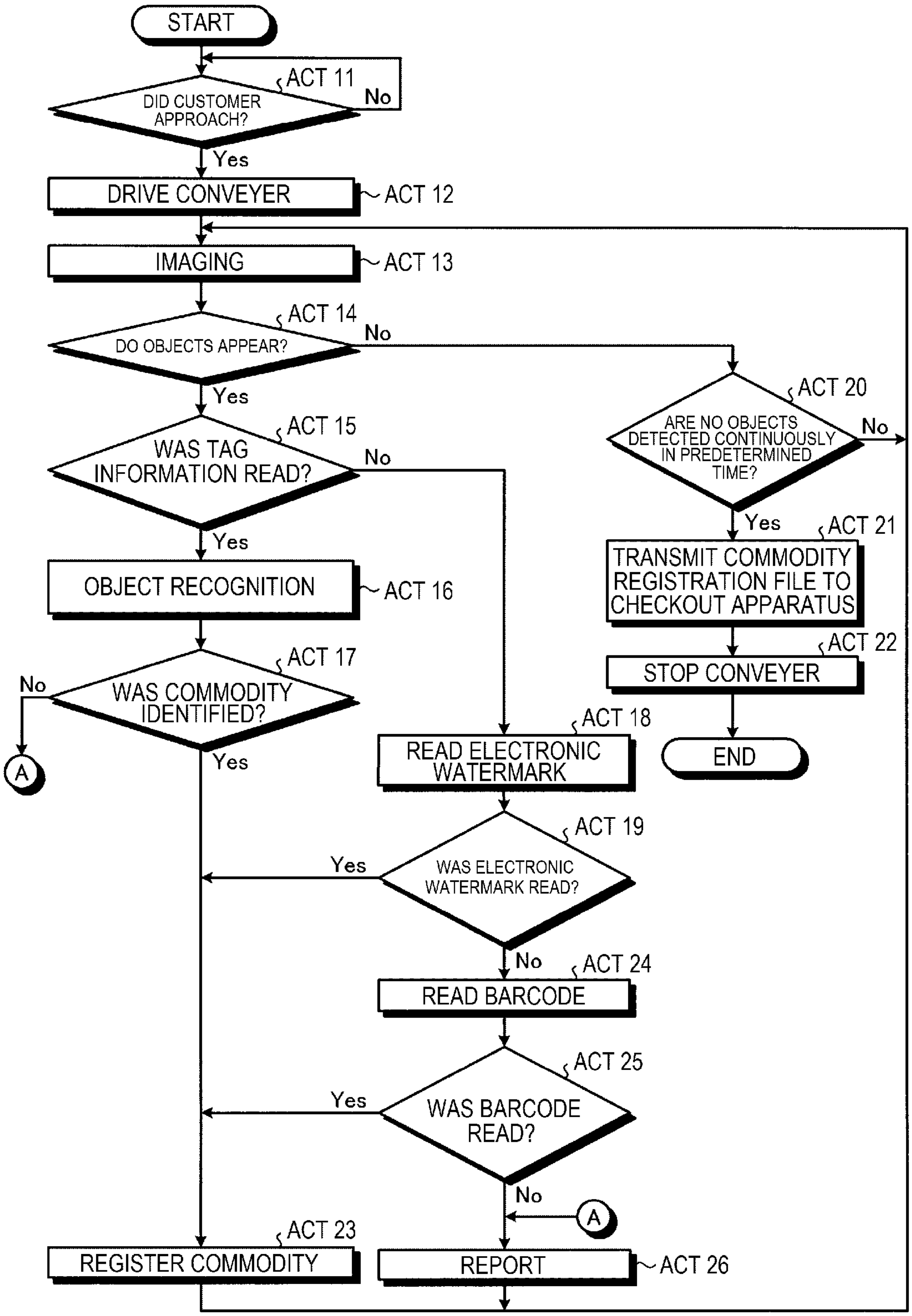
FIG. 9 is a flowchart showing an example of a flow of a commodity registration process performed by the commodity information reading apparatus of the embodiment.

First, a flow of processing performed by the commodity information reading apparatus 10 is explained. The commodity registration unit 118 registers the commodity identified by the commodity identification unit 117 in the commodity registration file F1 (Act 1). The detailed flow of the processing at Act 1 will be described later (FIG. 9).

The communication control unit 120 transmits the commodity registration file F1 to the checkout apparatus 30 (Act 2). Then, the commodity information reading apparatus 10 ends the processing in FIG. 8.

Next, a flow of the processing performed by the checkout apparatus 30 will be explained. The checkout apparatus 30 receives the commodity registration file F1 from the commodity information reading apparatus 10 (Act 3).

Subsequently, the checkout apparatus 30 performs the checkout process (Act 4). Then, the checkout apparatus 30 ends the processing in FIG. 8.

(Description of Flow of Processing Performed by Commodity Information Reading Apparatus)

Next, a flow of processing performed by the commodity information reading apparatus 10 is explained using FIG. 9. FIG. 9 is a flowchart showing an example of the flow of the commodity registration process performed by the commodity information reading apparatus 10 of the embodiment.

The customer sensing unit 110 determines whether or not the customer approached the commodity information reading apparatus 10 (Act 11). If a determination that the customer approached is made (Act 11: Yes), the processing moves to Act 12. On the other hand, if the determination that the customer approached is not made (Act 11: No), the unit repeats Act 11.

If the determination Yes is made at Act 11, the conveyance control unit 119 starts movement of the belt conveyer 11 by driving the conveyer drive motor 13 (Act 12).

The imaging control unit 111 allows the first camera 14, the second camera 15, and the third camera 16 to capture images (Act 13). The respective cameras simultaneously perform imaging.

The object sensing unit 112 determines whether or not objects appear in the captured images (Act 14). If a determination that objects appear is made (Act 14: Yes), the processing moves to Act 15. On the other hand, if a determination that objects do not appear is made (Act 14: No), the processing moves to Act 20.

If the determination Yes is made at Act 14, the wireless tag reading unit 116 determines whether or not tag information on the RFID tag 22 was read (Act 15). If a determination that the tag information on the RFID tag 22 was read is made (Act 15: Yes), the processing moves to Act 16. On the other hand, if the determination that the tag information on the RFID tags 22 was read is not made (Act 15: No), the processing moves to Act 18.

If the determination Yes is made at Act 15, the object recognition unit 115 respectively performs the object recognition on the images captured by the first camera 14, the second camera 15, and the third camera 16 (Act 16).

The commodity identification unit 117 determines whether or not the commodity H was identified by the object recognition performed at Act 16 (Act 17). If a determination that the commodity H was identified is made (Act 17: Yes), the processing moves to Act 23. On the other hand, if the determination that the commodity H was identified is not made (Act 17: No), the processing moves to Act 26.

If the determination No is made at Act 15, the electronic watermark reading unit 114 respectively reads the electronic watermarks with respect to the images captured by the first camera 14, the second camera 15, and the third camera 16 (Act 18).

Subsequently, the electronic watermark reading unit 114 determines whether or not the electronic watermarks were read (Act 19). If a determination that the electronic watermarks were read is made (Act 19: Yes), the processing moves to Act 23. On the other hand, if the determination that the electronic watermarks were read is not made (Act 19: No), the processing moves to Act 24.

The code symbol reading unit 113 respectively reads the barcodes with respect to the images captured by the first camera 14, the second camera 15, and the third camera 16 (Act 24).

Subsequently, the code symbol reading unit 113 determines whether or not the barcodes were read (Act 25). If a determination that the barcodes were read is made (Act 25: Yes), the processing moves to Act 23. On the other hand, if the determination that the barcodes were read is not made (Act 25: No), the processing moves to Act 26.

If the determinations Yes are made at Act 17, Act 19, and Act 25, the commodity registration unit 118 registers the read commodity information in the commodity registration file F1 (Act 23). Then, the processing returns to Act 13.

If the determination No is made at Act 17 or Act 25, the report control unit 121 judges that identification of the commodity H is hard, and reports using an indicator (not shown), alarm, or the like placed in the commodity information reading apparatus 10. Then, the processing returns to Act 13. Note that, if the determination No is made at Act 17 or Act 25, the belt conveyer 11 may be stopped and a store clerk may be called.

Next, returning to Act 14, if the determination No is made at Act 14, the object sensing unit 112 determines whether or not no objects are detected continuously in a predetermined time (Act 20). If a determination that no objects are detected continuously in the predetermined time is made (Act 20: Yes), the processing moves to Act 21. On the other hand, if the determination that no objects are detected continuously in the predetermined time is not made (Act 20: No), the processing returns to Act 13.

If the determination Yes is made at Act 20, the communication control unit 120 transmits the commodity registration file F1 to the checkout apparatus 30 (Act 21).

Subsequently, the conveyance control unit 119 stops the belt conveyer 11 by stopping the conveyer drive motor 13 (Act 22). Then, the commodity information reading apparatus 10 ends the processing in FIG. 9.

Though not shown in FIG. 9, the three cameras continuously perform imaging not to miss imaging of the commodity H. Therefore, the commodity identification unit 117 may continuously output the judgement results that the same commodity H appears in the continuously captured images. In this case, when the same commodity H is identified with respect to the continuous images, the commodity identification unit 117 judges that the commodity H is a single commodity in order to prevent registration of a plurality of the same commodities H. Note that, when an object does not appear in the images captured by the respective cameras even in only one frame, the commodity identification unit 117 judges that the commodities H identified before and after the frame without the object as other commodities.

Further, after the completion of the commodity registration, the commodity information reading apparatus 10 does not perform commodity registration for the next customer until the checkout process by the checkout apparatus 30 with respect to the registered commodity registration file F1 ends. That is, the checkout apparatus 30 transmits information representing the end of the checkout process to the commodity information reading apparatus 10. Then, the commodity information reading apparatus 10 starts the processing in FIG. 9 when receiving information representing the end of the checkout process from the checkout apparatus 30.

As described above, in the commodity information reading apparatus 10 of the embodiment, the code symbol reading unit 113 (first reading unit) reads the barcode 24 (code symbol) attached to the commodity H from the images of the commodity H captured by the imaging control unit 111 (imaging unit) using the first camera 14, the second camera 15, and the third camera 16. The electronic watermark reading unit 114 (second reading unit) reads the electronic watermark 26 attached to the commodity H from the images of the commodity H. The object recognition unit 115 (commodity recognition unit) recognizes the commodity H from the images of the commodity H. Then, the commodity identification unit 117 (commodity identification unit) identifies the commodity H appearing in the images based on at least one of the reading result of the code symbol reading unit 113, the reading result of the electronic watermark reading unit 114, and the recognition result of the object recognition unit 115. Therefore, commodity information may be read with less time and effort regardless of the form of the commodity H. Note that it is desirable that the code symbol reading unit 113, the electronic watermark reading unit 114, and the object recognition unit 115 perform the above described respective reading processes on the same images.

Further, in the commodity information reading apparatus 10 of the embodiment, if the reading result of the code symbol reading unit 113 (first reading unit) or the electronic watermark reading unit 114 (second reading unit) is obtained, the object recognition unit 115 (commodity recognition unit) identifies the commodity H based on the reading result. On the other hand, if the reading result of the code symbol reading unit 113 and the electronic watermark reading unit 114 is not obtained, the unit identifies the commodity H based on the recognition result of the object recognition unit 115. Therefore, the commodity H may be identified regardless of presence or absence of the barcode 24 (code symbol) or presence or absence of the electronic watermark 26.

In the commodity information reading apparatus 10 of the embodiment, the commodity H without the barcode 24 (code symbol) and the electronic watermark 26 is held in the tray 20, and the imaging control unit 111 (imaging unit) captures the images of the commodity H using the first camera 14, the second camera 15, and the third camera 16. Therefore, the commodity H without the barcode 24 (code symbol) and the electronic watermark 26 may be easily determined.

Further, in the commodity information reading apparatus 10 of the embodiment, the wireless tag reading unit 116 (wireless tag reading unit) reads the tag information of the RFID tag 22 (wireless tag) attached to the tray 20. Therefore, the commodity information reading apparatus 10 may easily recognize the presence of the tray 20.

In the commodity information reading apparatus 10 of the embodiment, the commodity identification unit 117 (commodity identification unit) identifies the commodity H based on the recognition result of the object recognition unit 115 (commodity recognition unit) under the condition that the wireless tag reading unit 116 (wireless tag reading unit) reads the tag information of the RFID tag 22 attached to the tray 20. Therefore, the processing of identifying the commodity H may be performed more efficiently.

Note that, in the commodity information reading apparatus 10 of the embodiment, when the commodity to be read is limited to the commodity H1, the commodity H1 is conveyed without being mounted on the tray 20, and accordingly, reading of the tag information is not performed at Act 15 in FIG. 9. Therefore, the object recognition unit 115 is not activated. Then, when at least one of the code symbol reading unit 113 and the electronic watermark reading unit 114 reads code information of a commodity, the commodity corresponding to the read code information is registered. Therefore, the commodity information reading apparatus 10 is operable when reading only the commodity H1. Similarly, the commodity information reading apparatus 10 is operable when reading only the commodity H2. As described above, even if the commodity H to be read by the commodity information reading apparatus 10 is only the commodity H1 or the commodity H2, the same function as that described as above that the commodity information may be read with less time and effort may be implemented.

While certain embodiments have been described, these embodiments are presented as examples, but not intended to limit the scope of the invention. These novel embodiments may be implemented in other various forms and various omissions, replacements, changes may be made without departing from the scope of the invention. These embodiments or their modifications are within the scope of the invention and within the scope of the invention described in claims and equivalents thereof.

What is claimed is:

1. A commodity information reading apparatus, comprising:

an imaging component for capturing an image of a commodity;

a first reader for reading a code symbol associated with the commodity from the image;

a second reader for reading an electronic watermark associated with the commodity from the image;

a commodity identification component for identifying the commodity appearing in the image based on at least one of a reading result of the first reader and a reading result of the second reader; and a commodity recognition component for recognizing the commodity from the image, wherein the commodity identification component identifies the commodity appearing in the image based on at least one of the reading result of the first reader, the reading result of the second reader, and a recognition result of the commodity recognition component.

2. The apparatus according to claim 1, wherein, if the reading result of the first reader or the reading result of the second reader is obtained, the commodity recognition component identifies the commodity based on the reading result, and if the reading result of the first reader and the reading result of the second reader are not obtained, the commodity identification component identifies the commodity based on the recognition result of the commodity recognition component.

3. The apparatus according to claim 1, wherein a commodity provided without the code symbol and without the electronic watermark is held in a tray and imaged by the imaging component.

4. The apparatus according to claim 3, further comprising a wireless tag reader for reading tag information of a wireless tag from the tray.

5. The apparatus according to claim 1, wherein the code symbol associated with the commodity is attached to the commodity or is attached to packaging of the commodity.

6. The apparatus according to claim 1, wherein the electronic watermark associated with the commodity is attached to the commodity or is attached to packaging of the commodity.

7. The apparatus according to claim 1, wherein the first reader is a barcode reader.

8. A method for a computer controlling a commodity information reading apparatus to perform the following functions:

capturing an image of a commodity;

reading a code symbol associated with the commodity from the image;

reading an electronic watermark associated with the commodity from the image;

identifying the commodity appearing in the image based on at least one of a reading result of reading the code symbol and a reading result of reading the electronic watermark;

recognizing the commodity from the image; and identifying the commodity appearing in the image based on at least one of the reading result of reading the code symbol, the reading result of reading the electronic watermark, and a recognition result of recognizing the commodity.

9. The method according to claim 8, wherein, if the reading result of reading the code symbol or the reading result of reading the electronic watermark is obtained, further comprising identifying the commodity based on the reading result, and if the reading result of reading the code symbol and the reading result of reading the electronic watermark are not obtained, further comprising identifying the commodity based on recognizing the commodity.

10. The method according to claim 8, further comprising reading tag information of a wireless tag.

11. A commodity information system, comprising:

a server comprising data of code symbols, electronic watermarks, and commodity images; and a plurality of commodity information reading apparatuses in communication with the server, each commodity information reading apparatus comprising:

an imaging component for capturing an image of a commodity;

a first reader for reading a code symbol associated with the commodity from the image;

a second reader for reading an electronic watermark associated with the commodity from the image;

a commodity identification component for identifying the commodity appearing in the image based on at least one of a reading result of the first reader and a reading result of the second reader; and a commodity recognition component for recognizing the commodity from the image, wherein the commodity identification component identifies the commodity appearing in the image based on at least one of the reading result of the first reader, the reading result of the second reader, and a recognition result of the commodity recognition component.

12. The commodity information system according to claim 11, wherein, if the reading result of the first reader or the reading result of the second reader is obtained, the commodity recognition component identifies the commodity based on the reading result, and if the reading result of the first reader and the reading result of the second reader are not obtained, the commodity identification component identifies the commodity based on the recognition result of the commodity recognition component.

13. The commodity information system according to claim 11, wherein a commodity provided without the code symbol and without the electronic watermark is held in a tray and imaged by the imaging component.

14. The commodity information system according to claim 13, further comprising a wireless tag reader for reading tag information of a wireless tag from the tray.

15. The commodity information system according to claim 11, wherein the code symbol associated with the commodity is attached to the commodity or is attached to packaging of the commodity.

16. The commodity information system according to claim 11, wherein the electronic watermark associated with the commodity is attached to the commodity or is attached to packaging of the commodity.

17. The commodity information system according to claim 11, wherein the first reader is a barcode reader.

* * * * *